United States Patent [19]
Weier

[11] 3,890,304
[45] June 17, 1975

[54] 7α-CARBAMOYL-17-HYDROXY-3-OXO-17α-PREGN-4-ENE-21-CARBOXYLIC ACID γ-LACTONE AND RELATED COMPOUNDS

[75] Inventor: Richard M. Weier, Deerfield, Ill.

[73] Assignee: G. D. Searle & Co., Chicago, Ill.

[22] Filed: Apr. 25, 1974

[21] Appl. No.: 464,253

[30] Foreign Application Priority Data

Nov. 9, 1973 Canada..........................185462

[52] U.S. Cl....... 260/239.57; 260/397.1 S; 424/241
[51] Int. Cl.................. C07c 173/00; C07c 173/10
[58] Field of Search................................ 260/239.57

[56] References Cited
UNITED STATES PATENTS
3,787,396  1/1974  Weir.............................. 260/239.57

Primary Examiner—Elbert L. Roberts
Attorney, Agent, or Firm—John J. McDonnell

[57] ABSTRACT

The present invention relates to 7α-carbamoyl steroidal spirolactones and to opened-chain carboxylic acids and salts derived therefrom and 5α,7-carboxylactones. More particularly, this invention provides novel compounds of the general structural formulae

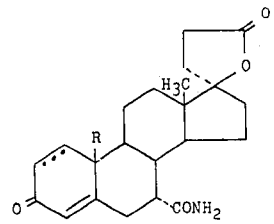
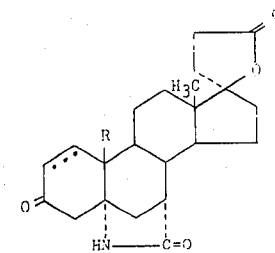

1a                                      2a

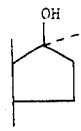
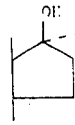

1b                                      2b wherein the dotted line indicates the optional presence of a Δ¹ unsaturated linkage; Z is hydrogen, alkali metal, alkaline-earth metal/2 or ammonium; and R is a methyl radical, with the proviso that when the 1,2-linkage is saturated, then R can also be hydrogen.

4 Claims, No Drawings

7 ALPHA-CARBAMOYL-17-HYDROXY-3-OXO-17ALPHA-PREGN-4-ENE-21-CARBOXYLIC ACID GAMMA-LACTONE AND RELATED COMPOUNDS

The present invention relates to 7α-carbamoyl steroidal spirolactones and to open-chain carboxylic acids and salts derived therefrom and 5α,7-carboxylactones. More particularly, this invention provides novel compounds of the general structural formulae

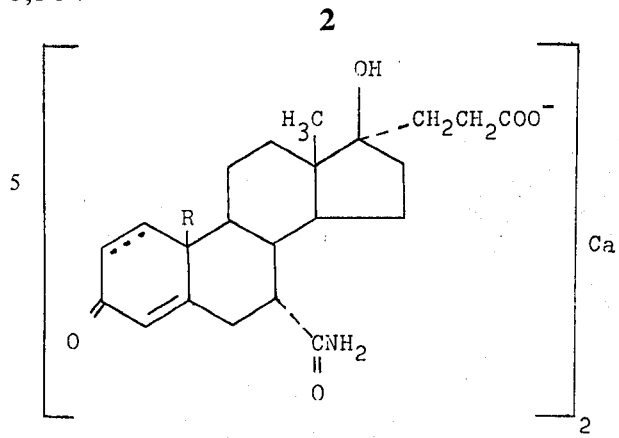

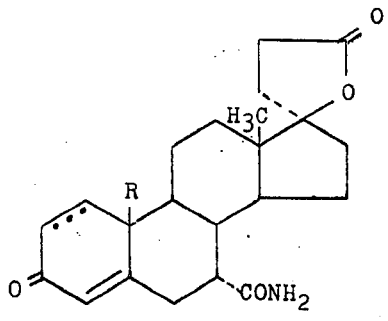

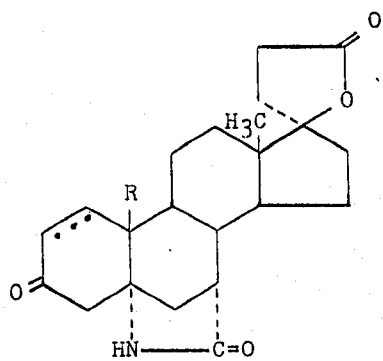

1a

2a

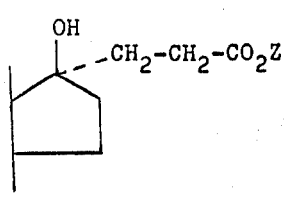

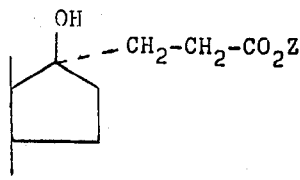

1b

2b wherein the dotted line indicates the optional presence of a Δ¹ unsaturated linkage; Z is hydrogen, alkali metal, alkaline-earth metal/2 or ammonium; and R is a methyl radical, with the proviso that when the 1,2-linkage is saturated, then R can also be hydrogen. For the purposes of this invention the lactone forms 1a and 2a are equivalent to the γ-hydroxy acids. Those skilled in the art will recognize interconvertability of the two forms.

Preferred alkali metals and alkaline-earth metals encompassed by the Z term include potassium, sodium, lithium, magnesium and calcium. Those skilled in the art will recognize that the term "alkaline-earth metal/2" is dictated by the fact that alkaline-earth metals are divalent, whereas the other groups represented by Z are monovalent; and when, for example, Z represents Ca/2 in formula (1b), the contemplated salts are more conventionally depicted thus These compounds are useful as intermediates in preparation of 7α-carboxylic acid derivatives of 1(a)(b) and 2(a)(b), described in U.S. Pat. No. 3,787,396 as potent diuretics.

Thus hydrolysis of the 7α-carbamoyl, prepared from 7α-cyano derivative described in U.S. Pat. No. 3,787,396, in aqueous base provides the 7α-carboxylic acid. In particular 2.8 parts of 7α-carbamoyl-17-hydroxy-3-oxo-17α-pregn-4-ene-21-carboxylic acid lactone, 2.2 parts of potassium hydroxide, and 60 parts of water are heated in an autoclave at 115° for 24 hours and the product is purified by acidification and extraction with acetone to provide 17-hydroxy-3-oxo-17α-pregn-4-ene-7α,21-dicarboxylic γ-lactone.

In the context of this invention the amide (1a) and lactam (2a) forms are equivalent since both are easily converted to the same 7α-carboxylic acid as shown in the following scheme

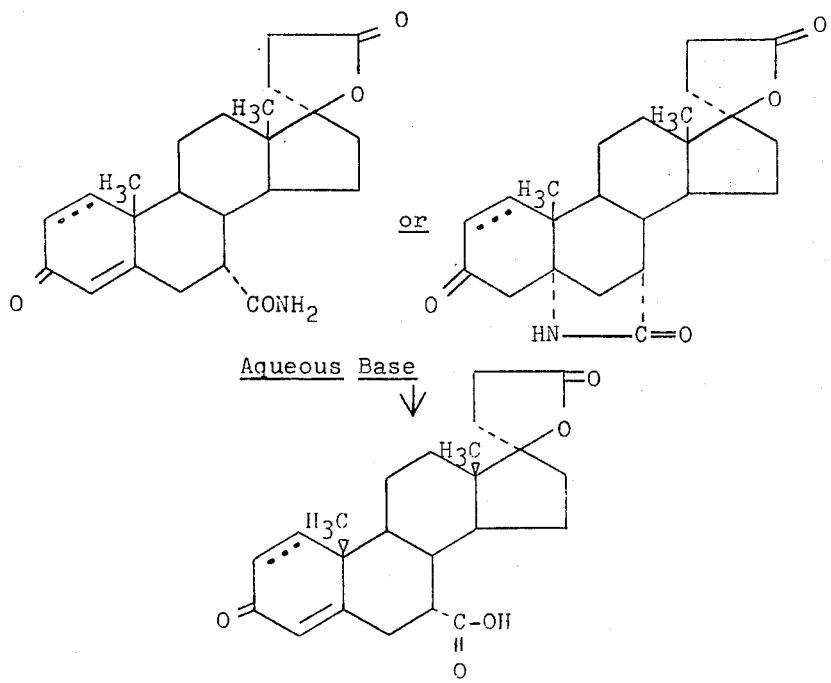

Suitable bases for use in the alkaline hydrolysis discussed above include alkali metal hydroxides, e.g. potassium hydroxide, and alkaline-earth metal hydroxides.

The invention will appear more fully from the examples which follow. In these examples, temperatures are given in degrees centigrade (°C.) and quantities of materials are expressed in parts by weight unless parts by volume are specified. The relationship between parts by weight and parts by volume is the same as that existing between grams and milliliters.

EXAMPLE 1

To a solution of 2.62 parts of glacial acetic acid and 19.99 parts of 17-hydroxy-3-oxo-17α-pregna-4,6-diene-21-carboxylic acid γ-lactone in 200 parts by volume of 2 percent aqueous dimethyl sulfoxide was added 4.28 parts of potassium cyanide. The resultant slurry was allowed to stand at room temperature for approximately 16 hours, then was heated on a steam bath for 2 hours. The reaction mixture was then allowed to stand for 24 hours at room temperature, after which time it was poured onto ice chips. The precipitate which formed was filtered, washed twice with water by decantation, dried and then recrystallized from methanol. There was thus obtained 7α-cyano-17-hydroxy-3-oxo-17α-pregn-4-ene-21-carboxylic acid γ-lactone, melting at about 228°–230°C.

EXAMPLE 2

To a solution of 0.79 part of glacial acetic acid and 3.91 parts of 17-hydroxy-3-oxo-19-nor-17αpregna-4,6-diene-21-carboxylic acid γ-lactone in 30 parts by volume of 2 percent aqueous dimethyl sulfoxide gas added 0.84 part of potassium cyanide. The resultant slurry was heated on a steam bath, with occasional stirring, for 6 hours. The reaction mixture was thereafter allowed to stand at room temperature for approximately 16 hours, then was heated on a steam bath for 1 hour and poured hot onto ice chips. The resultant crude brown solid was washed by decantation with a small amount of cold methanol and then was purified by treatment with decolorizing charcoal in boiling methanol. Recrystallization from cold methanol afforded 7α-cyano-17-hydroxy-3-oxo-19-nor-17α-pregn-4-ene-21-carboxylic acid γ-lactone, melting at about 239°–244°C.

EXAMPLE 3

A solution of 1.49 parts of 7α-cyano-17-hydroxy-3-oxo-17α-pregn-4-ene-21-carboxylic acid γ-lactone and 0.91 part of 2,3-dichloro-5,6-dicyano-1,4-benzoquinone in 72.1 parts of dioxane was refluxed for 7 hours. The reaction mixture was then stripped in vacuo and the brown residue was heated with 134 parts of dichloromethane. The insoluble brown solid was removed by filtration and the filtrate was washed three times with 2 percent aqueous sodium sulfite solution, then twice with saturated aqueous sodium chloride solution. The organic layer was dried over sodium sulfate and magnesium sulfate. The yellow oil thus obtained was crystallized and recrystallized from methanol to yield 7α-cyano-17-hydroxy-3-oxo-17α-pregna-1,4-diene-21-carboxylic acid γ-lactone, melting at about 259°–262°C.

EXAMPLE 4

A mixture of 0.73 part of 7α-cyano-17-hydroxy-3-oxo-17α-pregn-4-ene-21-carboxylic acid γ-lactone, 2.7 parts by volume of 0.73 N aqueous potassium hydroxide solution and 31.6 parts of methanol was warmed gently to effect solution. The mixture was allowed to stand for approximately 16 hours at room temperature, then was heated at 40°–50°C. for 40 minutes and stripped of solvent under reduced pressure. The yellow gummy residue was further dried azeotropically by distillation with ethanol. Trituration of the residue with ethyl ether afforded potassium 7α-cyano-17-hydroxy-3-oxo-17α-pregn-4-ene-21-carboxylate (monohydrate) as a yellow powder.

EXAMPLE 5

1.17 Parts of 7α-cyano-17-hydroxy-3-oxo-17α-pregn-4-ene-21-carboxylic acid γ-lactone and 0.60 part of potassium hydroxide in 40 parts of water were heated on a steam bath in a nitrogen atmosphere for 6 hours. At the end of that time, the reaction mixture was allowed to stand at room temperature for approximately 72 hours, then was diluted with 63.2 parts of acetone and acidified with 1 N hydrochloric acid. The resultant solution was allowed to stand at room temperature for 30 minutes. Concentration of the solution in vacuo gave a tan precipitate which was recrystallized from methanol to give 7α-carbamoyl-17-hydroxy-3-oxo-17α-pregn-4-ene-21-carboxylic acid γ-lactone hemihydrate, melting at about 348°C.

Substitution of an equivalent quantity of the compound obtained above for the steroidal starting material employed in the process described in the second paragraph of Example 9 afforded, by the procedure there detailed, hydrated 17-hydroxy-3-oxo-17α-pregn-4-ene-7α,21-dicarboxylic acid γ-lactone, melting at about 255°–260°C.

EXAMPLE 6

A solution of 1.0 part of 7α-cyano-17-hydroxy-3-oxo-17α-pregn-4-ene-21-carboxylic acid γ-lactone and 0.65 part of potassium hydroxide in 40 parts of water was heated on a steam bath for 7 hours. The reaction mixture was thereupon diluted with water and acidified with 1 N hydrochloric acid. The precipitate which formed was removed by filtration and the filtrate was concentrated to give a crystalline material. That material separated and then recrystallized from a mixture of dimethylsulfoxide and water. Obtained in this manner was hydrated 5α-amino-17-hydroxy-3-oxo-17α-pregnane-7α,21-dicarboxylic acid γ-lactone (21-carboxy group) γ-lactam (7-carboxy group), melting at about 253°–258°C.

2.8 Parts of the mixture obtained above and 2.2 parts of potassium hydroxide in 60 parts of water was heated in an autoclave at approximately 115°C. in a nitrogen atmosphere for 24 hours, then was diluted with acetone and acidifed. The resultant solution was allowed to stand at room temperature for 30 minutes and then was concentrated in vacuo. The brown solid thus obtained was separated by filtration and air dried. That solid was thereupon dissolved in ethyl acetate and extracted with aqueous 5 percent potassium bicarbonate solution. The potassium bicarbonate extracts were acidified with dilute hydrochloric acid and the precipitate which formed was separated by filtration to give hydrated 17-hydroxy-3-oxo-17α-pregn-4-ene-7α,21-dicarboxylic acid γ-lactone, melting at about 255°–260°C.

EXAMPLE 7

2.46 Parts of anhydrous sodium acetate was added to a solution of 1.38 parts of nitrogen tetroxide in acetic acid at 0°C. The reslutant mixture was stirred for 15 minutes and then 4.04 parts of 5α-amino-17-hydroxy-3-oxo-17α-pregnane-7α,21-dicarboxylic acid γ-lactone (21-carboxy group) γ-lactam (7-carboxy group) was added. The reaction mixture was stirred for 20 minutes at 0°C., then was poured into ice water and extracted with methylene chloride. The organic layer was washed successively with water, aqueous 5 percent sodium carbonate solution, and water, then was dried over anhydrous sodium sulfate to afford a crude product containing 5α-nitrosoamino-17-hydroxy-3-oxo-17α-pregnane-7α,21-dicarboxylic acid γ-lactone (21-carboxy group) γ-lactam (7-carboxy group).

1.0 Part of the crude product obtained above was added portionwise to a solution of 25 parts by volume of aqueous 5 percent potassium hydroxide in 43.5 parts of 1,2-dimethoxyethane. The resultant solution was stirred for 30 minutes at room temperature, then was concentrated in vacuo to remove the organic solvent. The residual aqueous material was acidified to pH 2 and stirred for 1 hour at room temperature. The precipitate which formed was removed by filtration and dissolved in methylene chloride. The methylene chloride solution was extracted three times with 20 part by volume portions of aqueous 5 percent potassium bicarbonate solution. The potassium bicarbonate extracts were acidified and the precipitate which formed was separated by filtration and dried to give hydrated 17-hydroxy-3-oxo-17α-pregn-4-ene-7α,21-dicarboxylic acid γ-lactone, melting at about 255°–260°C.

What is claimed is:

1. A compound of the formula

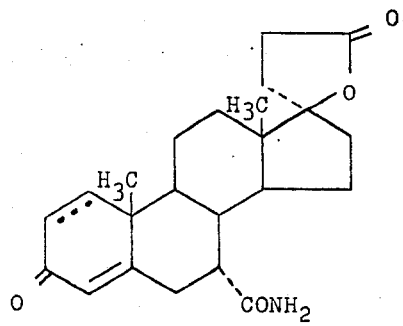

wherein the dotted line indicates the optional presence of a Δ¹ unsaturated linkage.

2. As in claim 1, the compound which is 7α-carbamoyl-17-hydroxy-3-oxo-17α-pregn-4-ene-21-carboxylic acid γ-lactone.

3. A compound of the formula

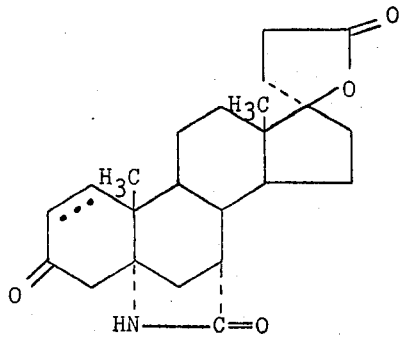

wherein the dotted line indicates the optional presence of a Δ¹ unsaturated linkage.

4. As in claim 3, the compound which is 5α-amino-17-hydroxy-3-oxo-17α-pregnane-7α,21-dicarboxylic acid γ-lactone (21-carboxy group) γ-lactam (7-carboxy group).

* * * * *